United States Patent [19]

Tani et al.

[11] Patent Number: 4,460,817
[45] Date of Patent: Jul. 17, 1984

[54] RESISTANCE REFLOW SOLDERING APPARATUS

[75] Inventors: Mitsukiyo Tani; Seiichi Kawashima, both of Hadano, Japan

[73] Assignee: Hitachi, Ltd., Tokyo, Japan

[21] Appl. No.: 387,665

[22] Filed: Jun. 11, 1982

[30] Foreign Application Priority Data

Jun. 19, 1981 [JP] Japan ................................ 93797

[51] Int. Cl.³ .............................................. B23K 1/12
[52] U.S. Cl. ................................ 219/85 D; 219/85 F; 219/85 G
[58] Field of Search ................ 219/85 R, 85 F, 85 D, 219/85 G, 85 M, 233, 243; 228/4.5, 6 A

[56] References Cited

U.S. PATENT DOCUMENTS 4,351,468 9/1982 Floury et al. ........................ 228/4.5

FOREIGN PATENT DOCUMENTS 2533609 2/1976 Fed. Rep. of Germany .... 219/85 F

Primary Examiner—Roy N. Envall, Jr.
Assistant Examiner—Alfred S. Keve
Attorney, Agent, or Firm—Antonelli, Terry & Wands

[57] ABSTRACT

A small-sized light-weight resistance reflow soldering apparatus for modifying the wiring pattern on a printed circuit board, with the soldering apparatus including a heating device with an adjustable weight, a supporting mechanism for a vertically movably supporting the heating device, a welding power supply for making the heating device produce heat enough to melt the solder for a predetermined time length, and a case accomodating these constituents. The soldering is effected by the heating device which produces the heat while being pressed against the jointing surface.

4 Claims, 10 Drawing Figures

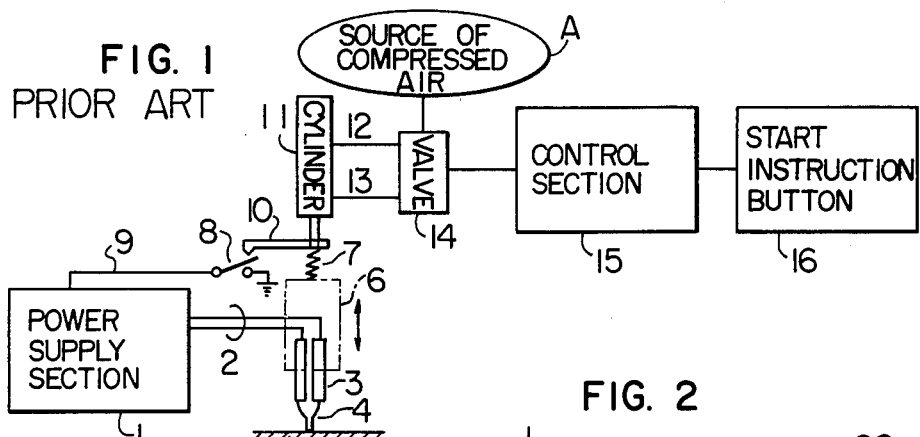
FIG. 1 PRIOR ART
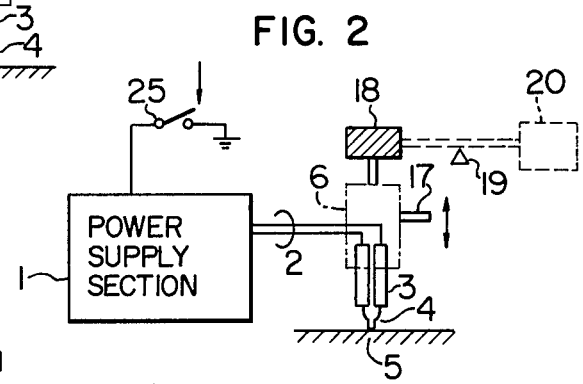
FIG. 2
FIG. 3a
FIG. 3b
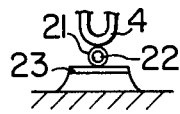
FIG. 3c
FIG. 4
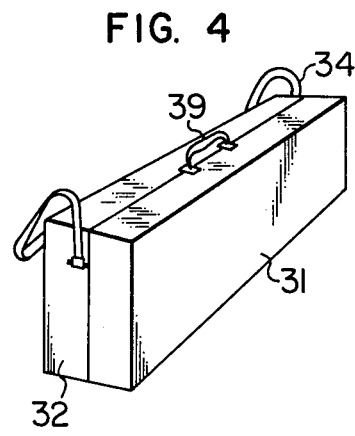
FIG. 5
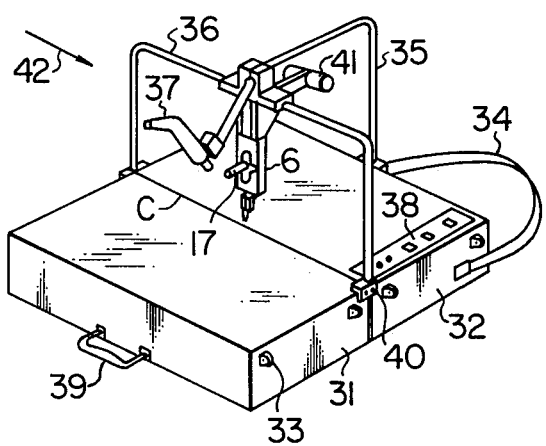

RESISTANCE REFLOW SOLDERING APPARATUS

BACKGROUND OF THE INVENTION

1. Field of the Invention

The present invention relates to a resistance reflow soldering apparatus and, more particularly, to a resistance reflow soldering apparatus for changing the wiring pattern on a printed circuit board.

2. Description of the Prior Art

In general, a printed circuit board carries various electronic parts which are connected electrically by a wiring pattern consisting of conductive thin film on the circuit board. A technique referred to as "resistance reflow soldering" has been used in adding a wiring pattern to existing pattern. Briefly, the resistance reflow soldering method has the steps of placing a wire wrapped by an evaporatable insulating coating on the printed circuit board which has been previously supplied with a solder, pressing an electrode tip onto the wire, and supplying electric current to the tip to produce joule heat to melt the solder while evaporating the insulating coating, to thereby connect the wire.

As shown in FIG. 1, a typical conventional apparatus for carrying out this resistance reflow soldering method has the following constituents:

(a) An electrode tip 4 adapted to produce joule heat when supplied with electric current.

(b) A pair of holders 3 connected to a pair of electrode terminals of the electrode tip 4.

(c) A vertially movable welding head module 6 integrally carrying the holders 3 in an electrically insulating relationship to each other, with the module 16 being provided at its upper end with a spring 7.

(d) A welder power supply section 1 for supplying electric current to the electrode tip 4 through a welding cable 2, when it is grounded through an cable 9 as a result of closing of a switch 8 by the action of the lever 10.

(e) A pneumatic cylinder 11 for moving the welder head module 6 and the lever 10 downwardly for overcoming the resilient resetting force of the spring 7.

(f) A valve 14 through which compressed air from a compressor A is supplied to the pneumatic cylinder 11 through an in-tube 12 and an out-tube 13 and is adapted to regulate the rate of air supply to the pneumatic cylinder 11.

(g) A control section 15 for controlling the state of the valve 14 to make the latter regulate the air supply rate, the control section 15 being adapted to be started by a start instruction button 16.

The resistance reflow soldering apparatus having the described construction operates in a the following manner. As the start instruction button 16 is turned ON, the control section 15 starts to operate to gradually increase the opening of a regulator valve of the valve 14 thereby to supply the compressed air from the compressor A to the cylinder 11. Consequently, the cylinder 11 drives the welder head module 6 and the lever 10 downwardly to overcome the force of the spring 7. The electrode tip 4 provided at the lower end of the module 6 is pressed against the printed circuit board 5 as a result of the downward movement of the module 6 and, at the same time, the lever 10 is moved downwardly to turn the switch 8 ON to start the supply of the electric current. The electrode tip 4 supplied with electric current produces joule heat which melts the solder on the printed circuit board 5 to thereby connect the wire.

Various difficulties are encountered in the soldering work with this soldering apparatus. Namely, the work has to be done highly precisely and minutely, because of the high density of the wiring on the printed circuit board. Therefore, an arm (not shown) supporting the welder head module 6 has to have a sufficient rigidity. Also, an X-Y table for supporting and indexing the printed circuit board 5 has to be constructed with rigid members in order to maintain a high levelness of the X-Y table. For these reasons, inevitably the size of the apparatus as a whole becomes large. The soldering (some times referred to as "welding", hereinunder) is made by supplying the electrode tip 4 with electric current while pressing the same against the printed circuit board 5. The quality of welding is seriously affected by any fluctuation in the welding condition such as pressure, pressing time, welding current flowing in the tip 4, time length of supply of electric current, and so forth.

In the apparatus shown in FIG. 1, therefore, the following operation method is adopted in order to stabilize the welding condition. For instance, the control section 15 has a timer which starts to count the time from the moment of inputting of the instruction from the instruction button 16. After the elapse of a predetermined time length, the control section 16 delivers a completion signal to the valve 14, to thereby cut-off the supply of compressed air to the cylinder 11. Consequently, the piston is moved upward to resume the starting position thereby terminating the pressing of the electrode tip 4 to the printed circuit board 5. Thus, the pressing time is precisely controlled by the timer in the control section 5. In addition, the timing of electric current supply to the electrode tip 4 has to be selected carefully such that the current is supplied when a contact pressure exceeding a predetermined pressure is maintained between the electrode tip 4 and the printed circuit board 5. Therefore, the timing of electric current supply to the electrode tip 4 is determined by a power supply starting signal which is delivered to the power supply 1 as a result of closing of the switch 8 as a limit switch by the lever 10 which descends accompanying the piston in the cylinder 11. Thus, the timing of the electric current supply is controlled precisely. The pressure at which the electrode tip 4 is pressed against the printed circuit board 5 is maintained at a level higher than a predetermined level as the power supply switch 8 detects a pneumatic pressure in the cylinder 11 exceeding a predetermined level.

Thus, in the conventional resistance reflow soldering apparatus, various factors of condition affecting the quality of the welding are precisely controlled to ensure a high quality of the product.

The conventional resistance reflow soldering method and apparatus described hereinabove, although quite superior in performance, encounters the following problems.

In recent years, the scale of electronic equipment and systems are becoming greater. When there is a demand for a modification of a logical circuit in a part of such system of large scale, the printed circuit board carrying the logical circuit to be modified is taken out of the system, and is sent back to the manufacturer to effect the required modification such as, for example, addition or change of the wiring by means of the conventional large-sized soldering apparatus. Meanwhile, the expensive electronic system as a whole is kept completely out of order, resulting in a huge loss from an economic point of view. It is of course possible to use a substitute printed circuit board in place of the circuit board taken out of the system, in order to keep the system operative. In this case, however, considerable labor and money are required for the attaching and detaching of the substitute printed circuit board. This problem is serious particularly when the electronic system has been exported abroad. In such a case, a huge sum of money is required for modifying only a small part of the whole electronic system. This problem, however, will be overcome if such a soldering apparatus is available as being portable to the country to which the system has been exported to permit the modification of the circuit at the site. The described conventional soldering apparatus, however, is too large and heavy to carry to such a country.

SUMMARY OF THE INVENTION

Accordingly, an object of the invention is to provide a resistance reflow soldering method and apparatus suited for the transportation to the place where the electronic system to be modified or repaired is situated.

To this end, according to one aspect of the invention, there is provided a resistance reflow soldering method having the steps of: positioning an electrode tip on a printed circuit board while observing the bonding surface by a magnifier, manually pressing the electrode tip weighted by the weight of its own or by a suitable additional weight, and supplying the electrode tip with electric current for a predetermined time.

According to another aspect of the invention, there is provided a resistance reflow soldering apparatus comprising a magnifier for use in observing the bonding surface on a printed circuit board, an electrode tip weighted by the weight of its own or adjustably weighted by a weight, a supporting pillar capable of changing the direction of the electrode tip in relation to the bonding surface, a power supply, and a case capable of accomodating the constituents mentioned hereinbefore. In the use of the apparatus, the case is opened to present a flat surface usable as a working bed, and the electrode tip is supported on the working bed by means of the supporting pillar. Then, after positioning the surface to be processed on the working bed, the weighted electrode is introduced manually onto the surface to be processed and the direction thereof is changed as desired. The electrode tip is naturally pressed against the solder on the surface and an operation means mounted on the case is operated manually thereby to supply electric current to the electrode tip for a predetermined time to melt the solder.

BRIEF DESCRIPTION OF THE DRAWINGS

FIG. 1 is a schematic view of a conventional large-scale resistance reflow soldering apparatus;

FIG. 2 is a schematic illustration for explaining the theory of the resistance reflow soldering apparatus in accordance with the invention;

FIGS. 3a, 3b and 3c are illustrations of the process of soldering on a printed circuit board;

FIG. 4 is a perspective view of a case for accomodating a soldering apparatus in accordance with the invention in a disassembled condition;

FIG. 5 is a perspective view of the case shown in FIG. 4 in an open state;

DETAILED DESCRIPTION OF THE PREFERRED EMBODIMENTS

Figure 6:
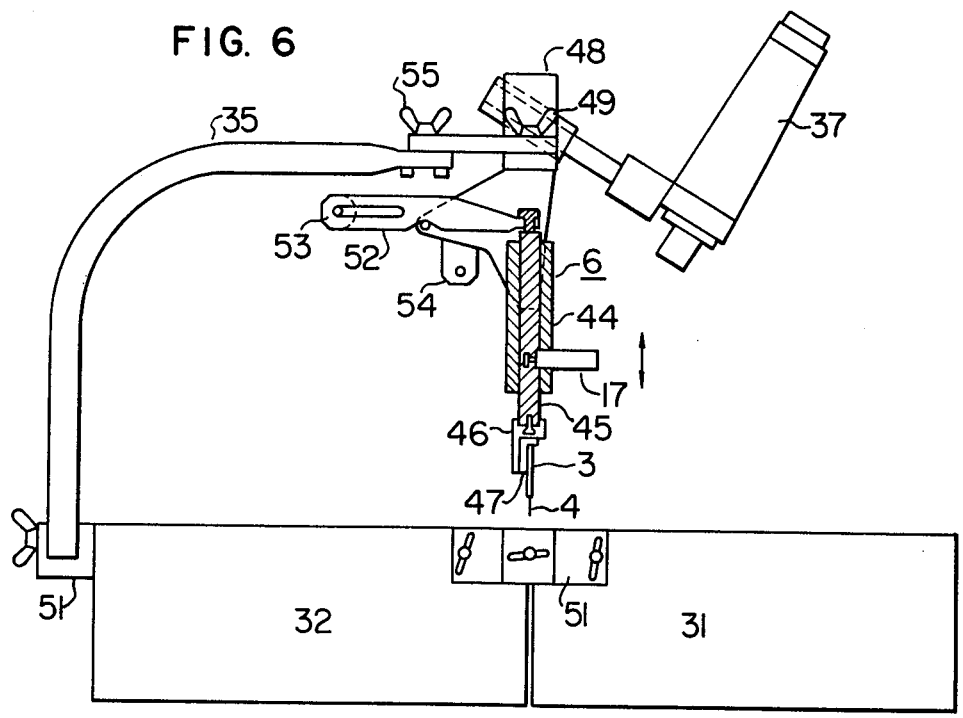
FIG. 6 is a partly-sectioned view of the soldering apparatus as viewed in the direction of an arrow 42 in FIG. 5.

The resistance reflow welding method and will be explained with specific reference to FIG. 2. The resistance reflow soldering apparatus shown in FIG. 2 basically has an electrode tip 4 adapted for welding mainly by solder, a welder power source or power supply section 1 for supplying electric current to the electrode tip 4, a vertically movable welder head 6 holding at its bottom the electrode tip 4, and a pressing means for pressing the welder head module 6 onto the solder on the printed circuit board 5. The pressing means can take the form of a module structure which can apply a constant load by the weight of itself or by an assistance of a weight 18. For permitting the weight applied by the additional weight 18 to be adjustable, the weight 18 and a counter weight 20 are carried by a lever which is supported by a fulcrum 19. In such a case, the pressing force can be adjusted by varying the weight of the counter weight 20 or the position of the fulcrum 19.

The welder head module 6 is provided with a lever which is adapted to be pinched by the operator's finger to move the module 6 up and down. The welder power supply 1 is connected to a switch 25. The electric current is supplied from the power supply 1 to the electrode tip 4 as this switch 25 is turned ON. The supply of the electric current has to be carried out under such a condition that the electrode tip 4 contacts the printed circuit board 5 and the weight of the weight 18 is applied through the module 6 to the electrode tip 4 so that these parts perfectly stand still. In order to add an ordinary interlocking function, a double depression type switch is used as the switch 25. The time length of electric current supply is selected to be about 0.1 second, and the design is made so as not to permit the fluctuation of the time. The supply of the electric current has to be made instantaneously so that the module 6 may not be moved during supplying of the electric current. The time length of current supply is beforehand set in the power supply section 1.

As shown in FIGS. 3a, 3b and 3c the process of the welding, as the first step, a solder 23 is beforehand placed on a copper foil 24 constituting a circuit on the printed circuit board 5. Then, a conductive wire 22 wrapped by an evaporatable coating 21 is placed on the solder 23. In this state, the electrode tip 4 is kept away from the printed circuit board 5. Then, as shown in FIG. 3b, the electrode tip 4 is pressed against the conductive wire 22 through the coating 21 and electric current is supplied to the electrode tip 4, so that the solder 23 is molten while the coating 21 is evaporated to solder the copper foil 24 to the conductive wire 22 as shown in FIG. 3c.

Referring again to FIG. 2, the weight 18 is attached to the welder head module 6, so that the sum of weight of the module 6 and the weight 18 is applied to the printed circuit board 5 through the electrode tip 4. It is considered that the contact pressure between the tip 4 and the printed circuit board 5 is stably held because the sum of the weights is unchanged. The contact pressure can be adjusted finely by the balance system through varying the position of the fulcrum 19 or varying the weight of the counter weight 20. The vertical movement of the module 6 is effected by manually moving the lever 17 up and down. Thus, in the use of the apparatus, the lowering of the module 6 prior to the power supply is made manually, and the lever is left after the lowering. Then, the switch 25 is turned ON to supply electric power to the tip 4 from the power supply. The application of the electric current is made quite uniformly because the time length of the current supply and the level of the current are beforehand set in the power supply section 1. After the completion of the supply of electric current, the module 6 is raised to the starting position manually by means of the lever 17. The foregoing description will be enough to make the principle of resistance reflow soldering method and apparatus of the invention understood fully.

As shown in FIG. 4, the container consists of two cases 31 and 32, and is provided with a suspender belt 34 and a handle 39. The container is further provided at its bottom with casters 33 shown in FIG. 5 to facilitate the transportation.

As shown in FIG. 5, the cases 31 and 32 are turned upside down such that the outer surfaces thereof constitute a working bed and two cases are united to each other by means of a connecting member 40. Then, the supporting pillar 36 and a rear pillar 35 are attached to the working bed as illustrated, so that the welder head module 6, magnifier 37, illuminating lamp 41 and so forth are supported by the supporting pillar 36. In order to reduce the weight, the pillars are constituted by pipes. The use of a plurality of pillars ensures a sufficient strength for supporting the module 6. The magnifier 37 is provided with a cross mark in its lens surface. The printed circuit board placed on the working bed is observed through this magnifier 37 so as to be correctly located on the working bed. The module 6 is so positioned that its center is located on the line of connection C between the cases 31 and 32, to thereby improve the maneuverability. As stated before the vertical movement of the module 6 is made by manipulating the lever 17 up and down. An operation panel 38 includes a push button for the power supply switch, push buttons for setting the welding condition, and so forth.

Considering that the cases 31, 32 accomodate precise parts of the apparatus, it is preferred to line the inner side of these cases with an elastic material such as urethane foam.

As shown in FIG. 6, the module includes a pillar support 51 for supporting the pillar 35, butterfly nuts 55, 49 a T-shaped angle 48, and a relay terminal 54. The balancer arm 52 and the auxiliary balancer 53 are provided for the adjustment of the welding pressure. It is possible to delicately adjust the welding pressure by finely moving the auxiliary balancer 53 along the balancer arm 52.

Figure 7:
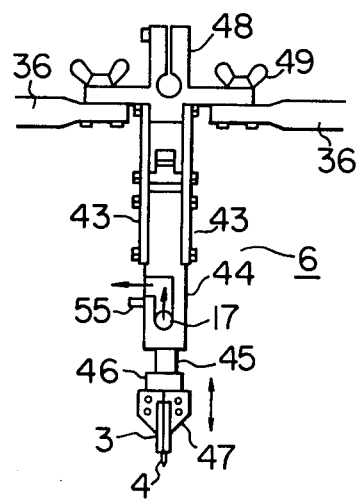
FIG. 7 is front elevational view of a welder head module.

The welder head module 6 is constituted by a slider support 44, slider 45, insulating block 46 and a holder block 47. The electrode tip 4 is held by the holder 3 secured to the holder block 47. The electrode tip 4 is driven up and down by manually moving the lever 17 up and down. As shown in FIG. 7, as the lever 17 is moved upward as indicated by an arrow, it is rotated to the left and is placed on the pedestal 56 thereby to hold the slider connected to the lever 17 at the top dead center.

Figure 8:
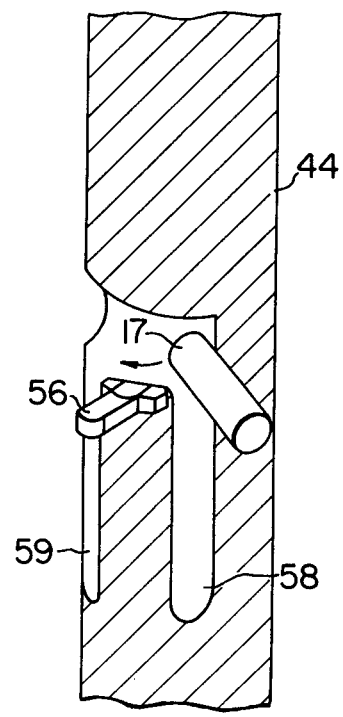
FIG. 8 is an illustration of a part of the welder head module.

As shown most clearly in FIG. 8, the lever 17 is movable up and down along a vertical groove 58 provided in the slider support 44, and is adapted to be turned to the left when it takes the upper position so as to rest on the pedestal 56. The lever 17 can be further rotated to the left beyond the pedestal 56 so that it becomes slidable vertically along the second vertical groove 59. The arrangement is such that there is a 90° difference of the orientation of the electrode tip 4 between the case where the lever 17 slides down along the first groove 58 and the case where the lever 17 slides down along the second vertical groove 59. As will be seen from FIG. 3, the orientation to be taken by the tip 4 is determined when the electrode tip 4 contacts the welding portion on the printed circuit board. If the tip 4 fails to take the correct posture, it is necessary to change the orientation of the printed circuit board, for otherwise the welding may be failed. In carrying out the method of the invention, it is often found difficult to change the orientation of the printed circuit board because the work has to be done on the working bed consisting of the outer surfaces of the cases 31, 32 having restricted area. In such a case, in the described embodiment, the lever 17 is switched between the first groove 58 and the second groove 59 to change the orientation of the tip 4, instead of varying the orientation of the printed circuit board.

As will be understood from the foregoing description, the resistance reflow soldering apparatus of the invention is much more simple than the conventional large-scale apparatus of the same kind. The apparatus of the invention, having a substantially equivalent performance to the large-scale and minutely operable soldering apparatus used in manufacturers, can easily be brought to abroad and can be used easily at the site where the electronic equipment is installed, for the modification of the printed circuit. By a suitable application of the invention, it becomes possible to modify the circuit in a large-scale electronic equipment for improving the performance, at any desired time and at the minimal cost. In other words, the present invention offers a great advantage of saving of money which may, for otherwise, be incurred by a long suspension of operation of the main system rather than the advantage brought about by the apparatus itself.

What is claimed is:

1. A resistance reflow soldering apparatus having a heating means adapted to be pressed onto a joint surface of a printed circuit board where a wiring pattern formed on said printed circuit board is to be jointed to an additional wire by means of a solder placed beforehand on said joint surface through heating said joint surface and melting said solder, the apparatus comprising:

a portable container including two case means for accommodating the reflow soldering apparatus, said case means including surface portions for forming a support for said printed circuit board during a soldering operation;

a heating means adapted to be positioned on said joint surface for producing enough heat to melt said solder;

supporting pillar means attachably and detachably mounted on said portable container for mounting said heating means on said portable container;

slider means connected to said heating means for enabling varying of a direction of contact of said heating means;

slider support means attachably and detachably supported by said supporting pillar means for enabling a sliding of said slider means in a vertical direction;

lever means mounted on said slider means for vertically moving said slider means;

weight means mounted on said slider means, said weight means being large enough to press said heating means onto said joint surface at a required pressure; and welding power supply means adapted to activate said heating means to melt said solder in such a manner that said heating means supported by said supporting pillar means is pressed onto said joint surface with a pressure produced by the weight of said weight means.

2. A resistance reflow soldering apparatus according to claim 1, wherein said heating means includes an electrode tip adapted to produce joule heat when supplied with electric current.

3. A resistance reflow soldering apparatus according to claim 1, wherein said weight means includes a weight member, and a weight adjusting means comprising a light-weight auxiliary balancer, a connecting member for connecting said weight member and said auxiliary balancer at a distance from each other, a fulcrum for supporting the weight of said weight member and said auxiliary balancer at a point on said connecting member, and means for varying a distance between said auxiliary balancer and said fulcrum along said connecting member.

4. A resistance reflow soldering apparatus according to claim 1, wherein said slider means is mounted so as to be rotatable with respect to said slider support means, said slider support means including a plurality of vertically extending grooves so as to enable said slider means to vary a direction of contact of the heating means to the joint surface by engaging said lever means with any one of said grooves.

* * * * *